(12) United States Patent
Funakubo et al.

(10) Patent No.: US 7,574,056 B2
(45) Date of Patent: *Aug. 11, 2009

(54) METHOD FOR COMPRESSION AND EXPANSION OF DISPLAY DATA

(75) Inventors: Noriyuki Funakubo, Hamakita (JP); Toru Kimura, Tokyo (JP)

(73) Assignee: Yamaha Corporation, Hamamatsu-shi (JP)

( * ) Notice: Subject to any disclaimer, the term of this patent is extended or adjusted under 35 U.S.C. 154(b) by 679 days.

This patent is subject to a terminal disclaimer.

(21) Appl. No.: 11/019,832

(22) Filed: Dec. 21, 2004

(65) Prior Publication Data

US 2005/0169540 A1 Aug. 4, 2005

(30) Foreign Application Priority Data

Dec. 25, 2003 (JP) ............ P 2003-431199

(51) Int. Cl.
G06K 9/36 (2006.01)
G06K 9/00 (2006.01)

(52) U.S. Cl. .................. 382/232; 382/166; 382/233

(58) Field of Classification Search ............ 382/232, 382/233, 166
See application file for complete search history.

(56) References Cited

U.S. PATENT DOCUMENTS

| 5,157,488 | A | * | 10/1992 | Pennebaker | ............ | 375/240.04 |
| 5,841,904 | A | * | 11/1998 | Sugiura | ............ | 382/233 |
| 5,883,979 | A | * | 3/1999 | Beretta et al. | ............ | 382/251 |
| 6,427,025 | B1 | * | 7/2002 | Shimomura et al. | ......... | 382/232 |
| 6,577,681 | B1 | | 6/2003 | Kimura | | |
| 7,248,735 | B2 | * | 7/2007 | Funakubo | ............ | 382/166 |
| 2002/0176632 | A1 | * | 11/2002 | Chrysafis et al. | ............ | 382/239 |

FOREIGN PATENT DOCUMENTS

| EP | 0974933 | A2 | 1/2000 |
| JP | 05-075875 | | 3/1993 |
| JP | 07-162859 | | 6/1995 |
| JP | 08-223430 | | 8/1996 |
| JP | 2000-059634 | | 2/2000 |

(Continued)

OTHER PUBLICATIONS

Fan et al. "A novel coefficient scanning scheme for directional spatial prediction-based image compression", Multimedia and Expo, 2003. ICME '03. Publication Date: Jul. 6-9, 2003, pp. II- 557-60 vol. 2.*

*Primary Examiner*—Samir A. Ahmed
*Assistant Examiner*—Li Liu
(74) *Attorney, Agent, or Firm*—Pillsbury Winthrop Shaw Pittman LLP

(57) ABSTRACT

A display data compression method can execute both irreversible compression and reversible compression, wherein display data are divided into a plurality of two-dimensional blocks, each of which is subjected to compression. In the irreversible compression, display data of each block are subjected to discrete cosine transform, quantization using a quantization table, one-dimensional rearrangement, and Huffman coding using one-dimensional Huffman table. In the reversible compression, display data of each block are subjected to scanning and compression, which are repeatedly performed by changing the scanning method therefor, so as to produce compressed data having the smallest number of effective bits. In expansion, the compressed data are decoded so that the decoded data are combined together over the blocks, thus restoring the original display data.

4 Claims, 13 Drawing Sheets

FOREIGN PATENT DOCUMENTS

| | | |
|---|---|---|
| JP | 2000-092330 | 3/2000 |
| JP | 2002-027472 | 1/2002 |
| JP | 2002-044463 | 2/2002 |
| JP | 2003-274191 | 9/2003 |
| JP | 2004-080154 | 3/2004 |

* cited by examiner

| 130 | 67 | 31 | 0 | 0 | 0 | 0 | 0 |
|---|---|---|---|---|---|---|---|
| 58  | 21 | 0  | 0 | 0 | 0 | 0 | 0 |
| 6   | 4  | 0  | 0 | 0 | 0 | 0 | 0 |
| 0   | 0  | 0  | 0 | 0 | 0 | 0 | 0 |
| 0   | 0  | 0  | 0 | 0 | 0 | 0 | 0 |
| 0   | 0  | 0  | 0 | 0 | 0 | 0 | 0 |
| 0   | 0  | 0  | 0 | 0 | 0 | 0 | 0 |
| 0   | 0  | 0  | 0 | 0 | 0 | 0 | 0 |

FIG. 7

| | | | | | | | |
|---|---|---|---|---|---|---|---|
| 8 | 6 | 3 | 0 | 0 | 0 | 0 | 0 |
| 5 | 2 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 8

| D00 | D01 | D02 | D03 | D04 | D05 | D06 | D07 |
|---|---|---|---|---|---|---|---|
| D08 | D09 | D10 | D11 | D12 | D13 | D14 | D15 |
| D16 | D17 | D18 | D19 | D20 | D21 | D22 | D23 |
| D24 | D25 | D26 | D27 | D28 | D29 | D30 | D31 |
| D32 | D33 | D34 | D35 | D36 | D37 | D38 | D39 |
| D40 | D41 | D42 | D43 | D44 | D45 | D46 | D47 |
| D48 | D49 | D50 | D51 | D52 | D53 | D54 | D55 |
| D56 | D57 | D58 | D59 | D60 | D61 | D62 | D63 |

FIG. 9

| ZIGZAG SCANNING STRING | | HUFFMAN CODING STRING |
|---|---|---|
| 8 | (1) | 010,0 |
| 6 | | 110101,0 |
| 5 | | 110100,0 |
| 0 | | 011 |
| 2 | | 100,0 |
| 3 | | 1010,0 |
| 0 | | |
| 0 | | |
| ⋮ | (58) | 010 |
| 0 | | |

512bit → 33bit

FIG. 10

| s | RANGE OF ΔDC |
|---|---|
| 0 | 0 |
| 1 | -1, 1 |
| 2 | -3, -2, 2, 3 |
| 3 | -7~ -4, 4~ 7 |
| 4 | -15~ -8, 8~ 15 |
| 5 | -31~ -16, 16~ 31 |
| 6 | -63~ -32, 32~ 63 |
| 7 | -127~ -64, 64~ 127 |
| 8 | -255~ -128, 128~ 255 |

DcL HUFFMAN TABLE

| CODE | s |
|---|---|
| 00 | 0 |
| 010 | 1 |
| 011 | 2 |
| 100 | 3 |
| 101 | 4 |
| 110 | 5 |
| 1110 | 6 |
| 11110 | 7 |
| 111110 | 8 |

DcC HUFFMAN TABLE

| CODE | s |
|---|---|
| 00 | 0 |
| 01 | 1 |
| 10 | 2 |
| 110 | 3 |
| 1110 | 4 |
| 11110 | 5 |
| 111110 | 6 |
| 1111110 | 7 |
| 11111110 | 8 |

HUFFMAN TABLE — HT3

| CODE | VALUE | SIGN BIT s, s=0:+ s=1:- |
|---|---|---|
| 00s | ±1 | |
| 010 | ZRE | ZRE: ALL 0 AFTER THIS CODE |
| 011 | Z1L | ZnL: n CONSECUTIVE 0s |
| 100s | ±2 | |
| 1010s | ±3 | |
| 10110 | Z2L | |
| 10111 | Z3L | |
| 11000s | ±4 | |
| 110010 | Z4L | |
| 110011 | Z5L | |
| 110100s | ±5 | |
| 110101s | ±6 | |
| 1101100 | Z6L | |
| 1101101 | Z7L | |
| 1101110s | ±7 | |
| 11011110 | Z8L | |
| 11011111 | Z9L | |
| 11100000s | ±8 | |
| 11100001s | ±9 | |
| 11100010s | ±10 | |
| 111000110 | Z10L | |
| 111000111 | Z11L | |
| 111001+3bit+s | ±11~±18 | |
| 11101+6bit | Z12L~Z63L | |
| 1111+7bit+s | ±19~±127 | |

FIG. 14

HUFFMAN TABLE — HT4

| CODE | VALUE | SIGN BIT s, s=0:+ s=1:- |
|---|---|---|
| 0s | ±1 | |
| 100 | Z1L | ZnL: n CONSECUTIVE 0s |
| 101s | ±2 | |
| 1100s | ±3 | |
| 11010 | ZRE | ZRE: ALL 0 AFTER THIS CODE |
| 11011 | Z2L | |
| 11100s | ±4 | |
| 111010 | Z3L | |
| 111011s | ±5 | |
| 111100s | ±6 | |
| 1111010 | Z4L | |
| 1111011 | Z5L | |
| 1111100s | ±7 | |
| 1111101s | ±8 | |
| 11111100 | Z6L | |
| 11111101 | Z7L | |
| 11111110+7bit+s | ±9~±127 | |
| 1111111101+6bit | Z8L~Z63L | |

CODING FORMAT zero_th code_th code_max

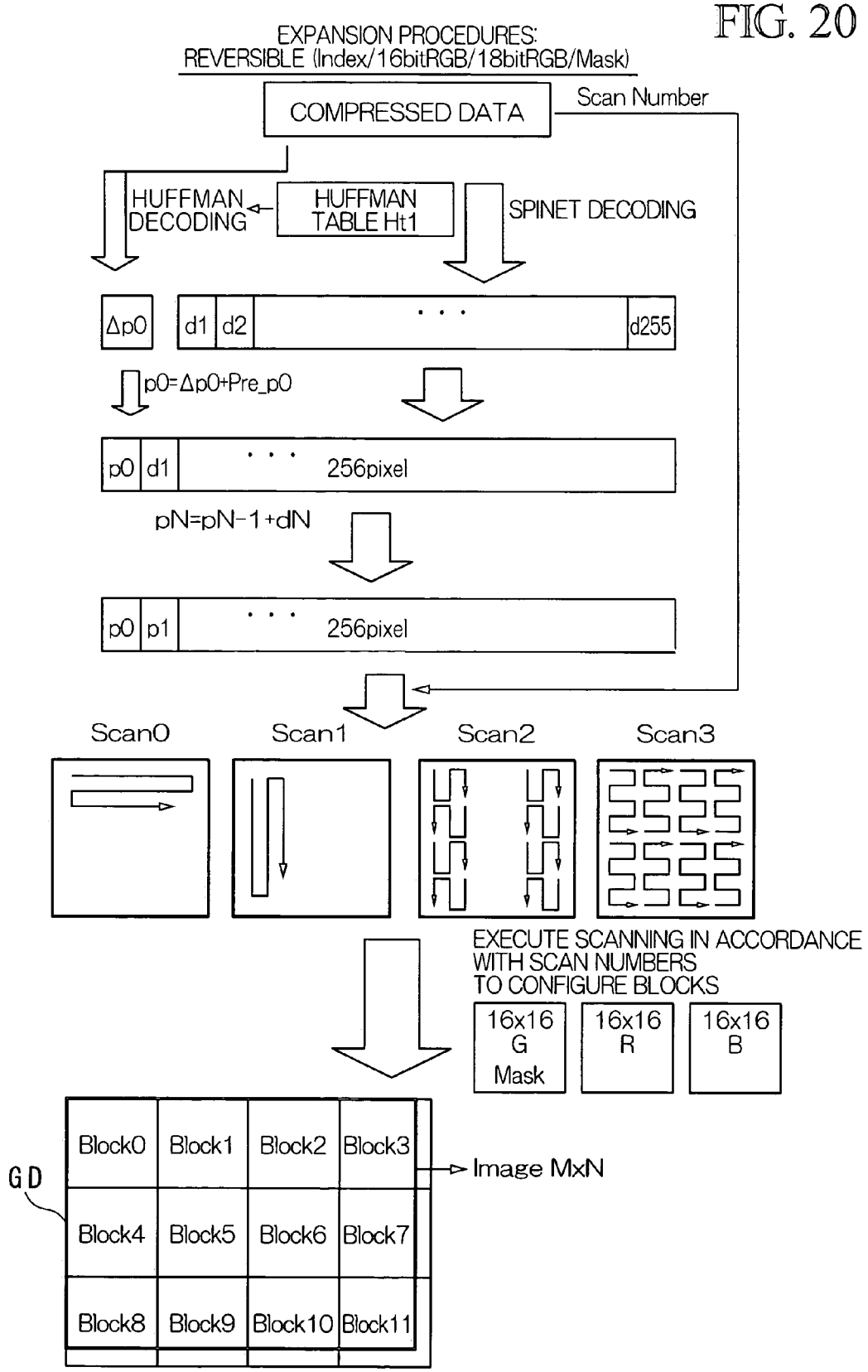

METHOD FOR COMPRESSION AND EXPANSION OF DISPLAY DATA

BACKGROUND OF THE INVENTION

1. Field of the Invention

This invention relates to methods for compression and expansion of display data, which allow irreversible high efficiency compression to be performed on display data realizing pictures naturally displayed in the RGB form, and which allows reversible compression to be performed on display data of the index form.

This application claims priority on Japanese Patent Application No. 2003-431199, the content of which is incorporated herein by reference.

2. Description of the Related Art

Conventionally, the following methods for compression of color image data are known.

(1) Cell Reference Method, and Line Reference Method

These methods effectively work on solid pictures in which the same color codes consecutively emerge before and after display data; however, they cannot raise compression ratios so much with respect to pictures in which same color codes do not consecutively emerge before and after display data. In addition, these methods are incapable of performing irreversible high efficiency compression on image data in the RGB form.

(2) Dictionary Method

In order to increase a rendering factor, this method requires numerous dictionary data. Similar to the cell reference method and line reference method, this method is designed to realize reversible compression; in other words, it is impossible to perform irreversible high efficiency compression on image data in the RGB form.

(3) DCT and Two-dimensional Huffman Coding Based on JPEG (i.e., Joint Photographic Image Coding Experts Group)

This method performs DCT (i.e., discrete cosine transform) on blocks each having 8×8 size, so that distortion may apparently emerge in units of blocks when the compression ratio is increased. This method is designed to basically perform sine approximation; hence, it is incapable of approximating edge-enhanced portions of animated images and the like. In addition, two-dimensional Huffman coding requires complicated Huffman tables, wherein table reference processes are difficult to be realized in the hardware. Furthermore, this method is incapable of performing reversible compression on image data having the index form realized by color palette conversion.

(4) Wavelet Transform and Arithmetic Coding (Based on JPEG2000)

In order to realize image compression and two-dimensional wavelet transform, this method requires buffers whose storage sizes match pixel sizes; hence, it is difficult to be realized in the hardware. In addition, this method requires a relatively long time to perform transform. Furthermore, arithmetic coding requires complicated calculations. In particular, when arithmetic coding is performed in units of bit planes in JPEG2000, it requires a relatively long time in decoding. Similar to DCT, the wavelet transform is realized using the correlation between images; hence, it does not suit reversible compression of image data.

In order to cope with the drawbacks of the conventionally known compression methods, we, the inventors, have filed Japanese Patent Application No. 2002-234984, which is now published as Japanese Patent Application Publication No. 2004-80154, which teaches irreversible high efficiency compression of image data in the RGB form and reversible compression of image data in the index form.

SUMMARY OF THE INVENTION

It is an object of the invention to provide a method for compression and expansion of display data, which allow both reversible compression and irreversible compression to be performed on display data with a simple structure and configuration.

A display data compression method according to this invention is adapted to irreversible compression and/or reversible compression on a plurality of display data, which represent dots displayed on the screen of a display and which are divided into a plurality of two-dimensional blocks. The display data compression method includes the following steps, wherein the irreversible compression includes first to fourth steps, and the reversible compression includes fifth and sixth steps.

(1) First step for performing discrete cosine transform on display data of each block.
(2) Second step for performing quantization on the display data by use of a prescribed quantization table.
(3) Third step for rearranging the display data in a one-dimensional order.
(4) Fourth step for performing Huffman coding on the display data by use of a one-dimensional Huffman table, thus producing compressed data through the irreversible compression.
(5) Fifth step for performing scanning on the display data of each block in accordance with a prescribed scanning method.
(6) Sixth step for performing compression on the rearranged display data.

In the reversible compression, the fifth and sixth steps are repeatedly performed by changing the scanning method, which is selected from among a plurality of scanning methods, so as to determine the scanning method for producing the compressed data having the smallest number of effective bits, which are then selectively output.

In the irreversible compression, it is possible to convert the display data corresponding to the RGB data into luminance data and color difference data. It is possible to select one of the quantization tables in response to the status of a displayed picture and the compression efficiency. In addition, it is possible to select one of the Huffman tables in response to the status of a displayed picture and the compression efficiency.

Furthermore, the reversible compression is realized by performing differential operations on adjacent data included in the rearranged display data, thus producing differential data.

A display data expansion method of this invention is adapted to expansion of compressed data that were compressed by irreversible compression performed on each of display data allocated to a plurality of blocks, which are subjected to discrete cosine transform, quantization using a quantization table, and Huffman coding using a Huffman table, wherein it comprises the following steps:

(1) First step for decoding the compressed data by expansion reverse to the irreversible compression.
(2) Second step for combining the decoded data over the plurality of blocks so as to restore original display data.

A display data expansion method of this invention is adapted to expansion of compressed data that were compressed by reversible compression performed on each of display data allocated to a plurality of blocks, which are subjected to scanning, rearrangement, and compression, wherein it includes the following steps.

(1) First step for decoding the compressed data by expansion reverse to the reversible compression.
(2) Second step for combining the decoded data over the plurality of blocks so as to restore original display data As described above, this invention allows execution of both of the irreversible compression and reversible compression, wherein it is possible to perform irreversible high efficiency compression on the normal display data of the RGB form, while it is also possible to perform reversible compression on the specific display data representing animated images, which have edge-enhanced portions to cause numerous noises due to irreversible compression, such as the data of the index form, α data, and mask data.

According to this invention, the irreversible compression is performed by use of one-dimensional Huffman tables, whereby compared with the other compression method using two-dimensional Huffman tables, it is possible to simplify the overall configuration and to increase the processing speed. In addition, the display data expansion method of this invention can share the same buffer configuration used for pipeline processing with respect to expansions handling the irreversibly-compressed data and reversibly-compressed data; that is, this invention is advantageous in designing the hardware configuration.

BRIEF DESCRIPTION OF THE DRAWINGS

These and other objects, aspects, and embodiments of the present invention will be described in more detail with reference to the following drawings, in which:

FIG. 2 shows the content of a quantization table;

FIG. 3 shows the content of a quantization table;

FIG. 4 shows the content of a quantization table;

FIG. 5 shows coefficient data prior to quantization;

FIG. 6 shows coefficient data prior to quantization;

FIG. 7 shows quantization data representing the result of quantization performed on the coefficient data shown in FIG. 6;

FIG. 8 shows an example of quantization data subjected to zigzag scanning;

FIG. 9 shows a zigzag scan string consisting of plural data, which are converted into Huffman codes;

FIG. 10 shows the content of a conversion table T1 used for compressive coding on top data in Huffman coding;

FIG. 11 shows the content of a DcL Huffman table HT1;

FIG. 12 shows the content of a DcC Huffman table HT2;

FIG. 13 shows the content of a Huffman table HT3;

FIG. 14 shows the content of a Huffman table HT4;

FIG. 20 is a schematic scheme for explaining reversible expansion procedures.

DESCRIPTION OF THE PREFERRED EMBODIMENT

This invention will be described in further detail by way of examples with reference to the accompanying drawings.

The compression method of this invention is realized by the hardware or microprocessor and allows compression of any type of color display data such as RGB (representing primary colors, i.e., red, green, and blue) data, YUV (representing luminance, and color differences) data, and index data, wherein it is capable of performing both irreversible high efficiency compression and reversible compression. The index data are codes designating colors and are necessarily converted into RGB data with reference to color palettes when displayed.

Hereinafter, procedures regarding irreversible compression and expansion will be described first; then, procedures regarding reversible compression and expansion will be described later.

(1) Procedures of Irreversible Compression and Expansion

Figure 1:
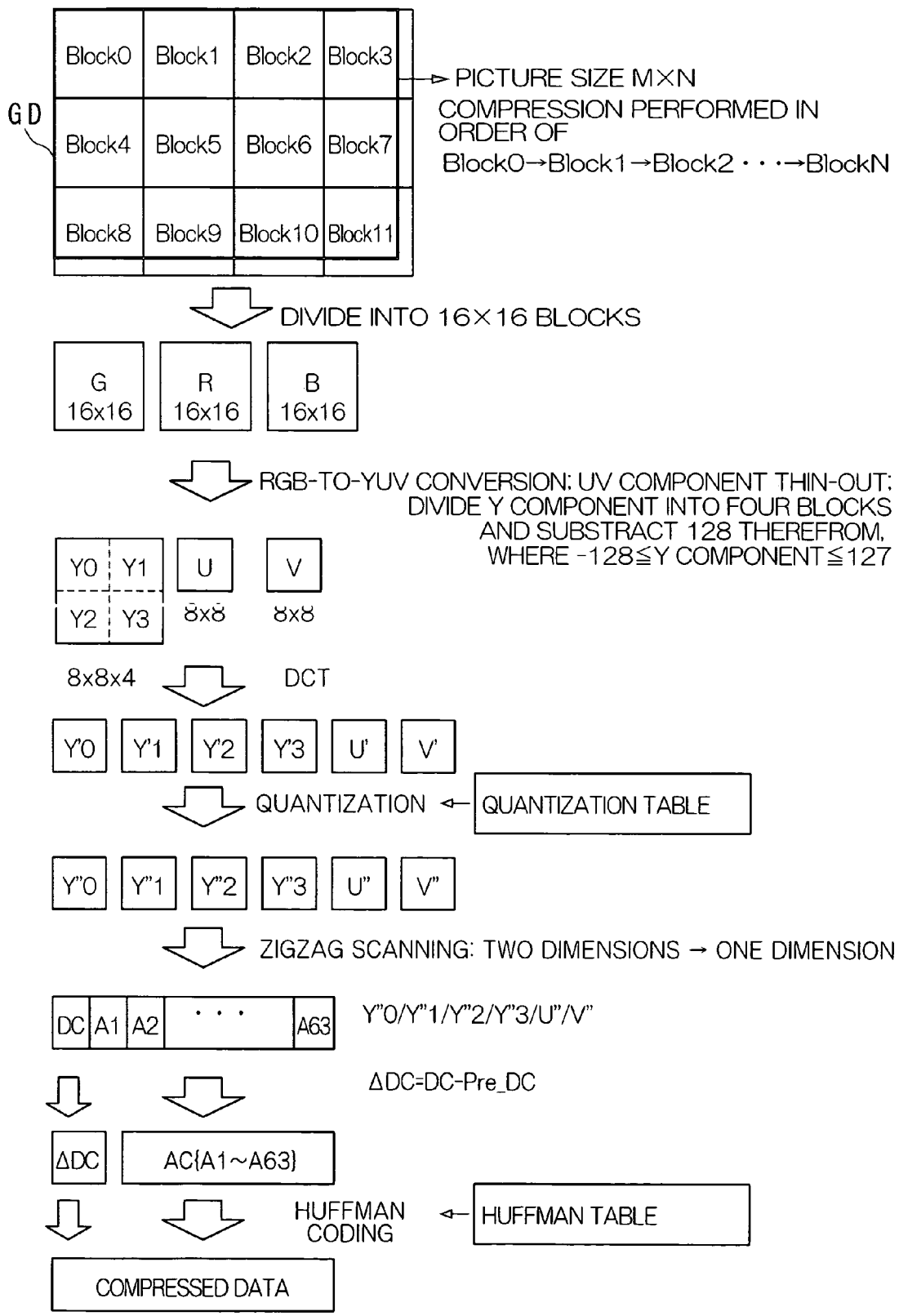
FIG. 1 shows a schematic scheme used for explaining irreversible compression procedures.

FIG. 1 shows procedures of irreversible compression and expansion, wherein reference symbol GD designates image data of the RGB form corresponding to dots displayed on the screen of a display (not shown). In the compression, image data are divided into blocks each consisting of 16×16 dots, each of which is subjected to compression by the following steps.

First, R data, G data, and B data, each of which comprises 16×16 data, are converted into YUV data respectively, wherein U data and V data are compressed by thin-out processing. Thus, as shown in FIG. 1, it is possible to produce luminance (or brightness) data Y, and color difference data U and V, each of which consists of 8×8 data. The luminance data Y is divided into four data Y0, Y1, Y2, and Y3, each of which consists of 8×8 data, whereby the luminance data Y0 to Y3 and the color difference data U and V are subjected to DCT based on the known transform formula.

Figures 2, 3, 4:
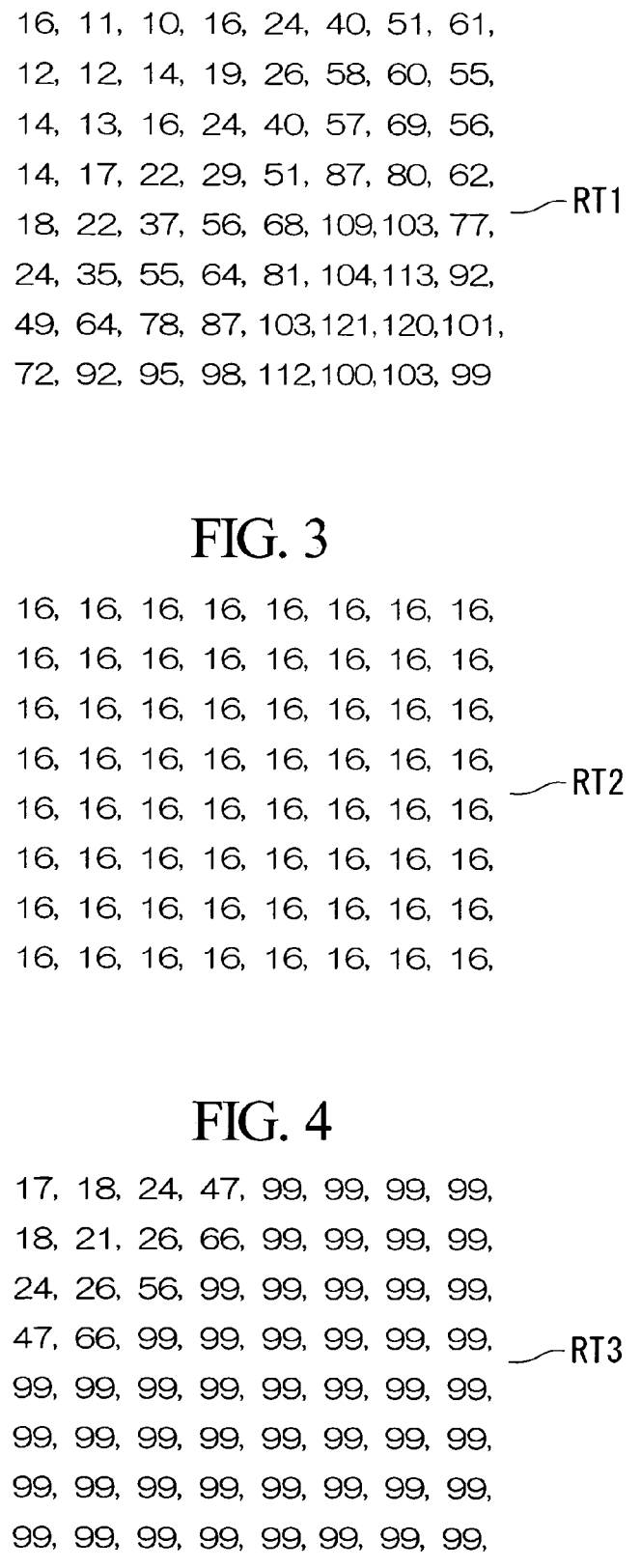

Thus, it is possible to produce six coefficient data (each consisting of 8×8 data) Y'0, Y'1, Y'2, Y'3, U', and V', each of which is then subjected to quantization using one of quantization tables RT1 to RT3 shown in FIGS. 2 to 4. Now, a description will be given with respect to the quantization using the quantization table RT1 of FIG. 2 on coefficient data shown in FIG. 5. First, data d00 is divided by '16' so as to obtain quantization data corresponding thereto by ignoring decimal fractions. Next, data d01 is divided by '11' so as to obtain quantization data corresponding thereto by ignoring decimal fractions. Similar operation is repeatedly performed on other data. Thus, it is possible to produce quantization data Y"0, Y"1, Y"2, Y"3, U", and V", each consisting of 16×16 data.

Specifically, when coefficient data Y'0 shown in FIG. 6 is subjected to quantization using the quantization table RT1 shown in FIG. 2, the leftmost data '130' in the first line shown in FIG. 6 is divided by the leftmost data '16' in the first line of FIG. 2 so as to calculate a quotient, in which decimal fractions are ignored, thus obtaining data '8' (see the leftmost data in the first line of FIG. 7). Next, second data '67' next to the leftmost data in the first line of FIG. 6 is divided by second data '11' next to the leftmost data in the first line of FIG. 2 so as to calculate a quotient, in which decimal fractions are ignored, thus obtaining data '6' (see second data next to the leftmost data in the first line of FIG. 7). Similar operation is repeated so as to produce the quantization data Y"0 shown in FIG. 7.

The quantization table RT1 is used for luminance data and RGB data, while the quantization table RT3 I is used for color difference data. Both of the quantization tables RT1 and RT3 are created by conducting fine quantization on low-frequency components and by conducting rough quantization on high-frequency components. In addition, the quantization table RT3 is used for compression of luminance data representing edge-enhanced pictures such as animated images and for compression of RGB data. The quantization table RT2 performs uniform quantization in the overall range of frequencies, ranging from low-frequency components and high-frequency components.

It is possible to adequately select any one of the quantization tables RT1 to RT3 in response to the status of the compressed image, or the distribution of DCT coefficient data, or the compression ratio as necessary.

The aforementioned quantization data Y"0, Y"1, Y"2, Y"3, U", and V" are subjected to zigzag scanning so that they are rearranged in a one-dimensional zigzag order ranging from low-frequency components to high-frequency components. For example, quantization data consisting of data D00 to D63 shown in FIG. 8 are rearranged in the order of D00, D01, D08, D16, D09, D02, . . . , D63. Similarly, the quantization data Y"0 shown in FIG. 7 is subjected to zigzag scanning to produce a data string shown in FIG. 9. Through zigzag scanning, it is possible to produce six groups of data strings, which are then subjected to compression using Huffman codes. Suppose that some quantization data are subjected to zigzag scanning to produce a data string of "DC A1 A2 . . . A63", wherein the top data "DC" is converted into ΔDC by use of a formula of ΔDC=DC-Pre_DC, where Pre_DC denotes previous version of data DC one data string beforehand, and in the first data string, it is set to '0'.

Next, ΔDC is subjected to compression by the following procedures.

That is, a conversion table T1 shown in FIG. 10 is used to convert ΔDC into 's', which is then subjected to coding with reference to a DcL Huffman table HT1 shown in FIG. 11 or a DcC Huffman table HT2 shown in FIG. 12. Herein, the DcL Huffman table HT1 is used for specific data strings representing luminance data, index data, and RGB data, while the DcC Huffman table HT2 is used for other data strings representing color difference data. This is because color difference data tend to have smaller amplification values. Then, codes obtained by the Huffman table HT1 or HT2 are added with low-order 's' bits of data ΔDC and are further added with a sign bit (i.e., one bit) representing positive sign or negative sign, thus producing compressed data.

Suppose that the aforementioned procedures are performed so as to determine that the difference between the top data '8' of the zigzag scan string shown in FIG. 9 and the first data of the previous data string is '1', whereby 's' whose value is '1' is read from the conversion table T1 (see FIG. 10) and is then subjected to coding into '010' with reference to the DcL Huffman Table HT1 shown in FIG. 11. Thereafter, this code is added with a sign bit to produce compressed data "010.0" (see FIG. 9).

Next, the data string of A1, . . . , A63 is subjected to compression with reference to a Huffman Table HT3 shown in FIG. 13 or a Huffman Table HT4 shown in FIG. 14. For example, when the zigzag scan string shown in FIG. 9 is subjected to Huffman coding, the first data '6' of the zigzag scan string except the top data '8' that was already compressed in the aforementioned procedures is converted into "110101s" with reference to the Huffman table HT3, wherein due to a positive sign applied thereto, the converted data are translated into "110101.0" (see FIG. 9). Then, the second data '5' is converted into "110100s" with reference to the Huffman table HT3, wherein due to a positive sign applied thereto, the converted data are translated into "110100.0" (see FIG. 9). Then, the third data '0' is converted into "011" with reference to "ZIL" of the Huffman table HT3. Similarly, the fourth data '2' and the fifth data '3' are respectively converted into "100.0" and "1010.0" as shown in FIG. 9. All the sixth to sixty-fourth data are '0', so that fifty-eight consecutive data '0' are all converted into "010" with reference to "ZRE" of the Huffman table HT3.

By performing the coding using the Huffman tables HT1 and HT3, it is possible to compress the zigzag scan string of 512 bits into a Huffman code string of 33 bits. Incidentally, either the Huffman table HT3 or HT4 is adequately selected in response to the status of the displayed image or is selected in consideration of a better compression efficiency. For example, the Huffman table HT2 suits images having numerous gradations, and the Huffman table HT4 suits images having complicated patterns.

Figure 15:
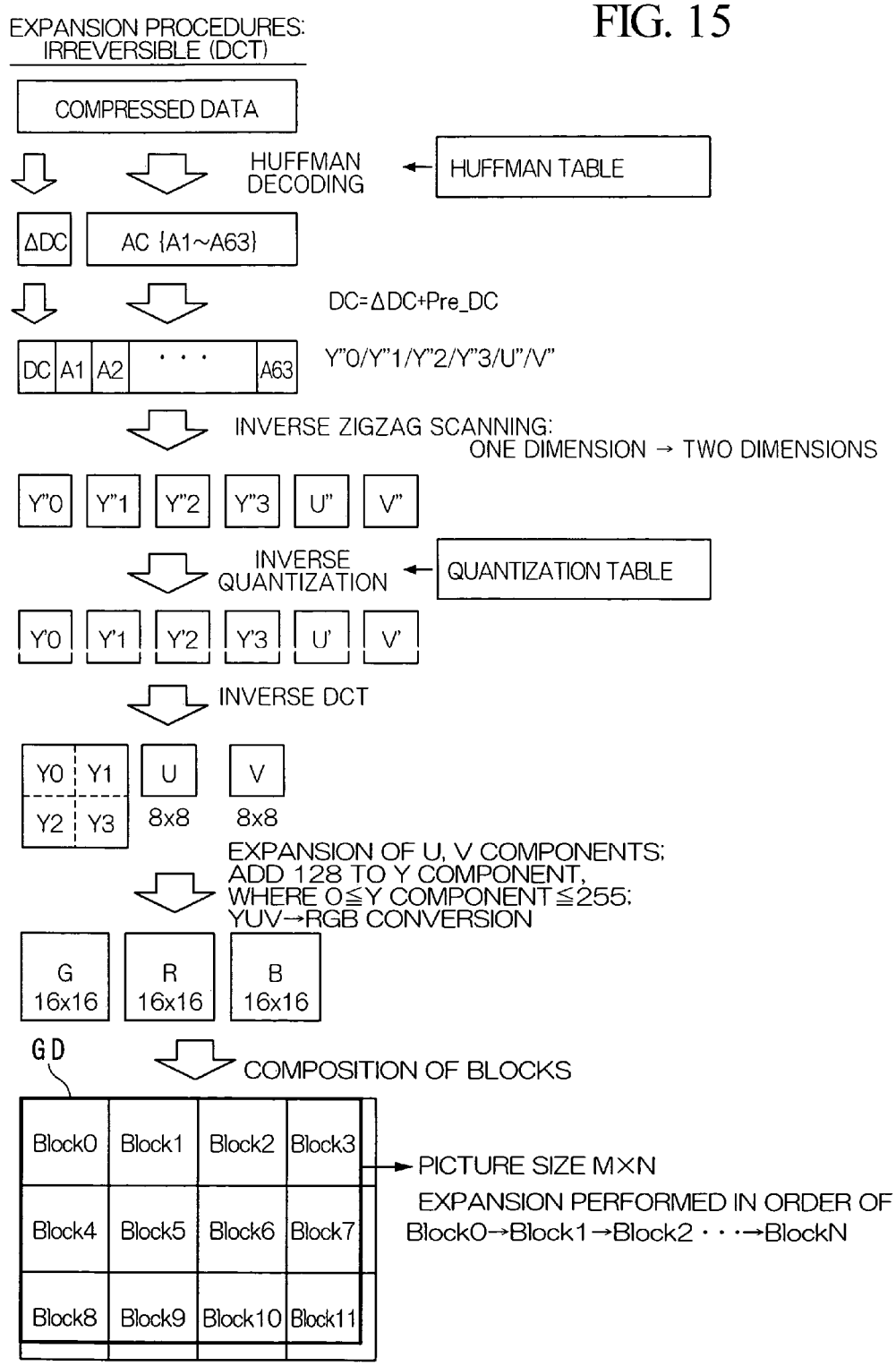
FIG. 15 shows a schematic scheme used for explaining irreversible expansion procedures.

Next, expansion procedures for expanding the compressed data, which are compressed by the aforementioned irreversible compression procedures, will be described with reference to FIG. 15.

First, the compressed data are subjected to decoding using the Huffman tables TH1 to TH4 so as to reproduce data ΔDC, which is then restored to original data DC by use of the formula of "ΔDC=DC+Pre_DC". Thus, it is possible to reproduce a data string of "DC A1 A2 . . . A63", which is then subjected to inverse zigzag scanning to reproduce the two-dimensional arrangement of quantization data Y"0, Y"91, Y"2, Y"3, U", and V". This process is irreversible; hence, strictly speaking, the compressed data of Y"0, Y"1, Y"2, Y"3, U", and V" do not accurately match the expanded data described above.

Next, the quantization data of Y"0, Y"1, Y"2, Y"3, U", and V" are restored to coefficient data of Y'0, Y'1, Y'2, Y'3, U', and V' by use of the quantization tables RT1 to RT3. This process is irreversible. Th coefficient data of Y'0, Y'1, Y'2, Y'3, U', and V' are subjected to inverse DCT so as to reproduce luminance data Y0 to Y4, and color difference data U and V, which are then converted into RGB data.

The aforementioned expansion is performed with respect to each block of the compressed data, whereby after completion of the expansion, all blocks regarding the RGB data are combined together to reproduce the original image data GD.

Figure 16:
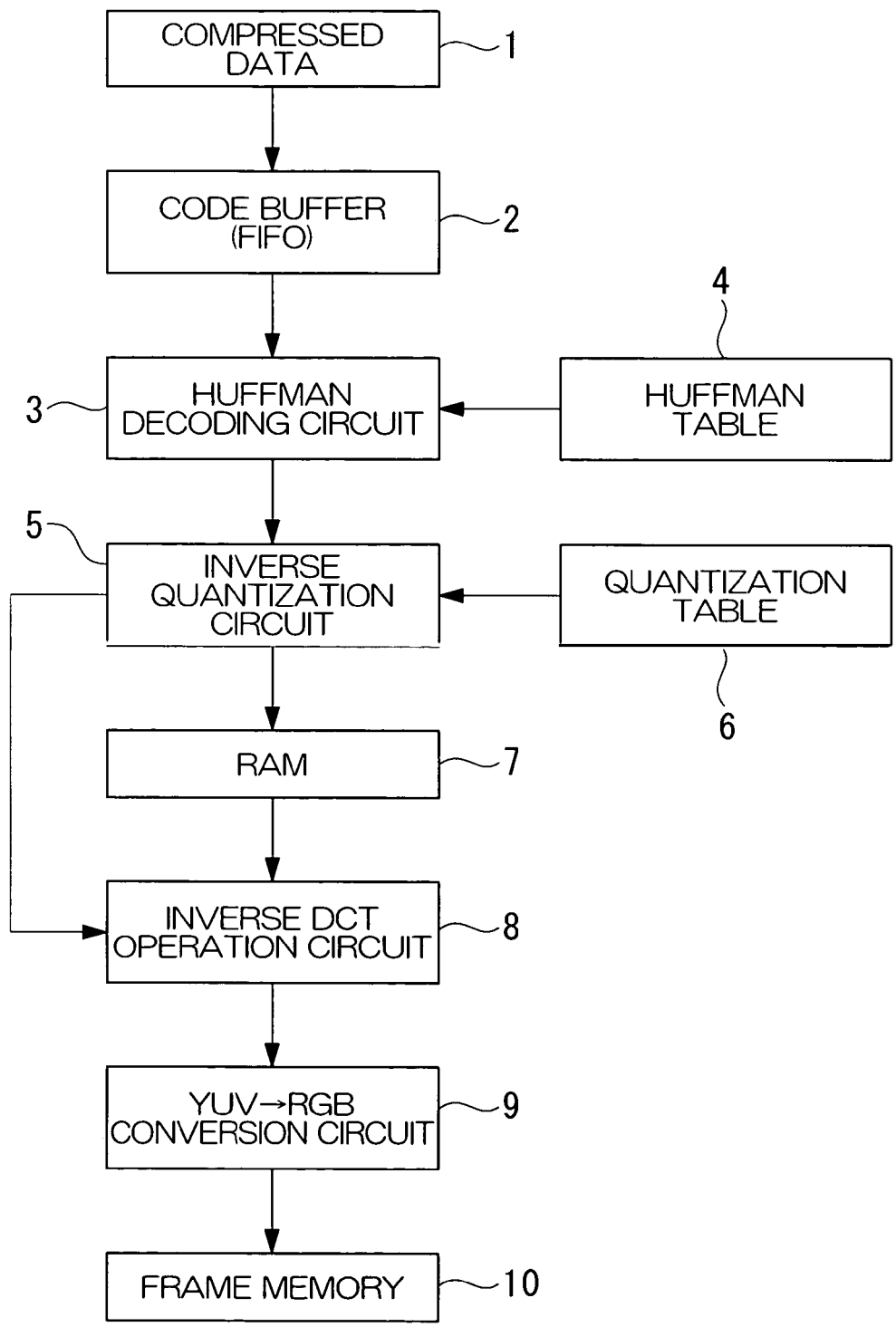
FIG. 16 is a simplified block diagram showing the overall constitution of an expansion circuit.

FIG. 16 is a simplified block diagram showing the overall constitution of an expansion circuit for performing the aforementioned expansion. In FIG. 16, reference numeral 1 designates a read-only memory (i.e., a ROM) for storing compressed data, which include compressed image data, contents of Huffman tables used for compression, and identification numbers of quantization tables. Reference numeral 2 designates a code buffer having a first-in-first-out (FIFO) configuration, which temporarily stores the compressed data read from the ROM 1 and then transfers them to a Huffman decoding circuit 3. The Huffman decoding circuit 3 decodes the compressed data by use of a Huffman table 4, which was used in compression, so as to output decoded data to an inverse quantization circuit 5.

By use of a quantization table 6 that was used in the quantization process, the inverse quantization circuit 5 performs inverse quantization on the output data of the Huffman decoding circuit 3, so that the inversely quantized data are written into a random-access memory (i.e., a RAM) 7. Every time data of one block (consisting of 8×8 data) is written into the RAM 7, such a writing event is notified to an inverse DCT operation circuit 8. The inverse DCT operation circuit 8 uses an inverse DCT operation formula to perform inverse DCT on the data of the RAM 7; then, the result is supplied to YUV-to-RGB conversion circuit 9. The YUV-to-RGB conversion circuit 9 converts YUV data output from the inverse DCT conversion circuit 8 into RGB data, which are then written into a frame memory 10.

(2) Procedures of Reversible Compression and Expansion

The reversible compression is used for compression of mask data and a data in display data. The reversible compression is also used for compression of index data corresponding to display data (or image data).

Figure 17:
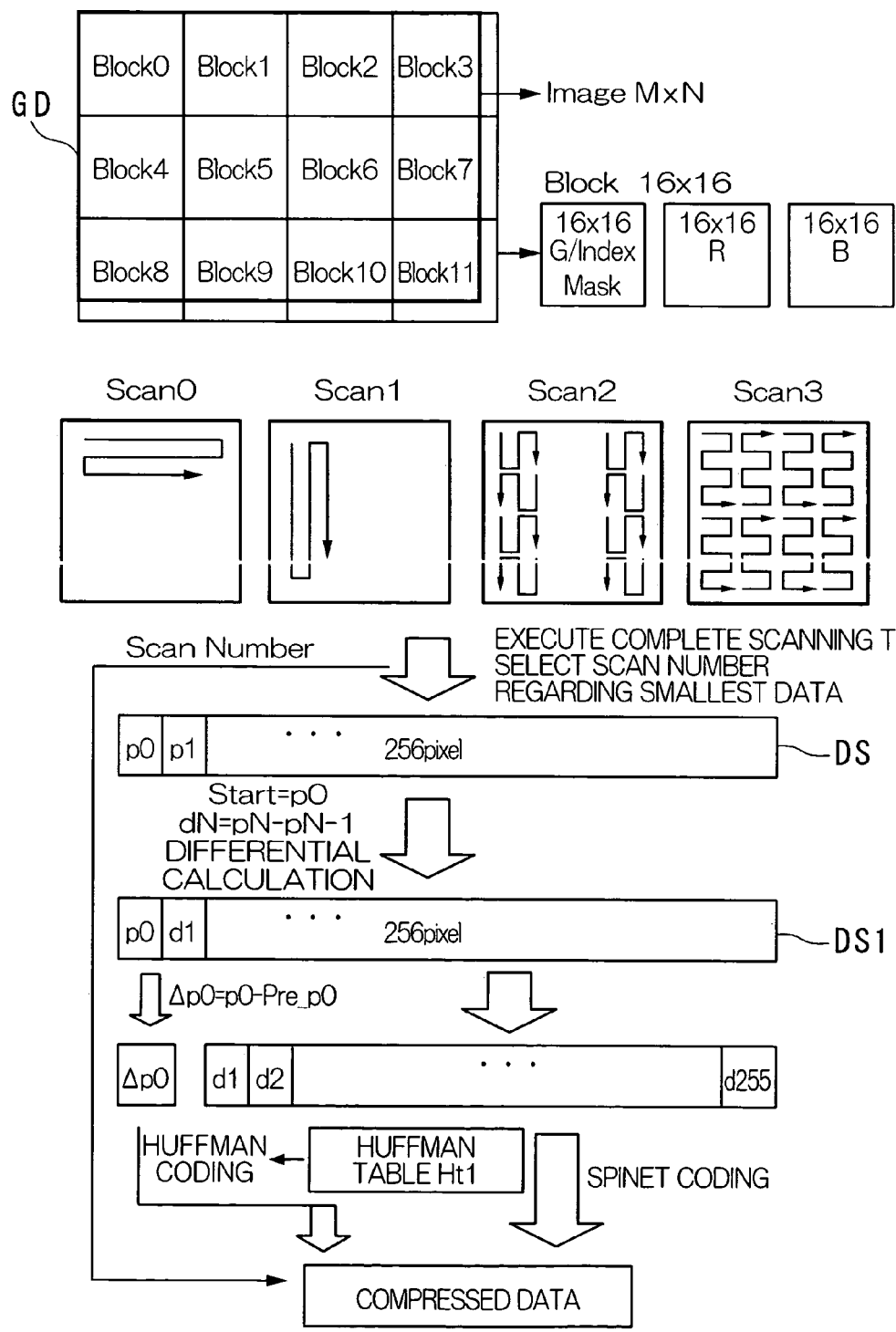
FIG. 17 shows a schematic scheme for explaining reversible compression procedures.

FIG. 17 shows reversible compression procedures, wherein as similar to the aforementioned irreversible compression, color image data GD are divided into blocks each consisting of 16×16 data, so that each block is subjected to compression. When the image data GD correspond to index data, one block of index data consists of 16×16 data. When the image data GD correspond to RGB data, one block comprises R data, G data, and B data, each of which consists of 16×16 data. Compression procedures are performed in units of 16×16 data as follows:

First, scanning is performed to rearrange two-dimensional data in a single line, wherein as shown in FIG. 17, four types of scanning Scan0 to Scan3 are preset in advance. According to Scan0, scanning is performed horizontally on 16×16 data in such a way that the first line is scanned in the direction from the left to the right; then, after completion of scanning of the first line, the second line is scanned from the right to the left; then, after completion of scanning of the second line, the third line is scanned from the left to the right. Similar operation is repeatedly performed with respect to the other lines. Thus, it is possible to produce a data string DS consisting of 256 data. The reason why the compressed data are rearranged as described above is to increase the compression efficiency in consideration of the property of the image data representing a horizontally striped pattern in which similar data are arranged horizontally.

According to Scan1, scanning is performed vertically on 16×16 data in such a way that the first column is scanned from the top to the bottom; then, after completion of scanning of the first column, the second column is scanned from the bottom to the top; then, after completion of scanning of the second column, the third column is scanned from the top to the bottom. Similar operation is repeatedly performed on the other columns. Thus, it is possible to produce a data string DS consisting of 256 data. Scan1 can increase the compression coefficient with respect to a vertically striped pattern. According to Scan2, each block of 16×16 data is further divided into small blocks, each of which is subjected to the aforementioned scanning similar to Scan1, thus producing a data string DS. According to Scan3, each block of 16×16 data is further divided into small blocks, each of which is subjected to the aforementioned scanning similar to Scan0, thus producing a data string DS. The aforementioned Scan2 and Scan3 can increase the compression efficiency in particular with regard to the specific picture in which the same pattern and color are partially repeated.

Of course, scanning adapted to the present embodiment is not necessarily limited to the four types of scanning shown in FIG. 17. Therefore, it is possible to use various types of scanning such as scanning in the slanted direction.

Now, the aforementioned scanning according to Scan0 is performed to produce a data string DS, which is then subjected to differential operation to produce a data string DS1. In the differential operation, first data of the data string DS is directly transferred as first data of the data string DS1, and differential data dN (where dN=pN−p(N−1)) is written as second data of the data string DS1. That is, second data d2 of the data string DS1 is produced by subtracting first data p1 from second data p2 in the data string DS. Due to such differential operation, even when image data are monotonously increased or decreased in value so that the same data are sequentially aligned, it is possible to increase the compression efficiency.

Next, first data p0 of the data string DS1 is converted into $\Delta p0$ in accordance with the equation of $\Delta p0 = p0 - Pre\_p0$, where Pre_p0 denotes the previous data previously set to the data string DS1 as p0, wherein the very first data thereof is set to '0'. The converted data $\Delta p0$ is subjected to compressive coding with reference to the DcL Huffman table HT1 shown in FIG. 11 or the DcC Huffman table HT2 shown in FIG. 2.

Next, the data string DS1 including data d1 to d225 are subjected to compression by SPINET coding, details of which will be described below.

First, each of data included in the data string DS1 (except data p0) are checked so as to detect the following data.

code_max: the length of data having the maximal number of bits.

zero_max: the number of 0s maximally aligned in data is detected so as to produce zero run-length maximal length representing the detected number of bits corresponding to 0s.

In addition, the following data are temporarily set.

code_th: short code length.

zero_th: zero run-length short code length.

Figure 18A:
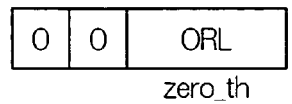
FIGS. 18A to 18E show formats for use in compression according to SPINET coding.
Figure 18B:
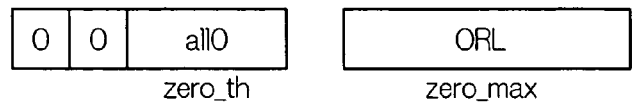

Next, detection is performed on each of prescribed portions of the data string DS1 in which two or more 0s consecutively emerge, thus detecting the number of consecutive 0s (i.e., zero run-length) therein. Then, it is checked whether or not the detected number is equal to zero_th or less. If so, it is expressed in the format of FIG. 18A, which is configured by "00" and "0RL" (representing zero run-length), wherein the number of bits assigned to 0RL is identical to the number of bits for representing the value of zero_th. If the detected number is greater than zero_th, it is expressed in the format of FIG. 18B showing two types of data, one of which is configured by "00" and "all0" and the other of which is configured by "0RL", wherein the number of bits assigned to all0 is identical to the number of bits for representing the value of zero_th. In addition, the number of bits assigned to 0RL is identical to the number of bits for representing zero_max.

Suppose that zero_th is set to '2', and zero_max is set to '7', wherein when three 0s consecutively emerge in the data string DS1 so that the zero run-length is '3', they are expressed by single data of "0011". When the zero run-length is '13', thirteen 0s consecutively emerging in the data string DS1 are expressed by single data of "00000001101". Coding using the aforementioned formats is performed with respect to all portions in which two or more 0s consecutively emerge.

Figure 18C:
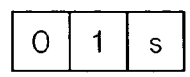

Next, it is checked whether or not each of data included in the data string DS1 except 0s is identical to the absolute value of the preceding data thereof previously set to the data string DS1. When it matches the absolute value of the preceding data, it is expressed in the format shown in FIG. 18C, which is configured as "01s" where 's' is set to '0' when the subject data having a positive sign matches the absolute value of the preceding data, and 's' is set to '1' when the subject data having a negative sign matches the absolute value of the preceding data.

Next, it is checked whether or not the number of effective bits of each of the remaining data included in the data string DS1, which are not subjected to coding using the aforementioned formats, is equal to or less than code_th. If so, it is expressed in the format shown in FIG. 18D, which is configured by "10" and "val" representing the data value thereof, wherein the number of bits assigned to val is equal to the number of bits for representing code_th. When the number of bits assigned to val is greater than code_th, it is expressed in the format shown in FIG. 18E, which is configured by "11" and "val" representing the data value thereof, wherein the number of bits assigned to val is identical to the number of bits for representing code_max.

Figure 18D:
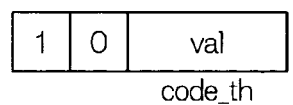
Figure 18E:
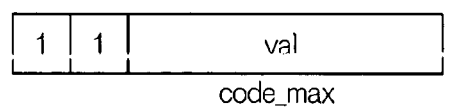

Suppose that code_th is set to '3', and code_max is set to '7', wherein when the subject data is set to '6', it is expressed by single data of "10110". When the subject data is set to '15', it is expressed by single data of "110001111". Coding using the formats shown in FIGS. 18D and 18E is performed with respect to all other data included in the data string DS1, which are not subjected to coding using the aforementioned formats shown in FIGS. 18A to 18C.

Figure 19:
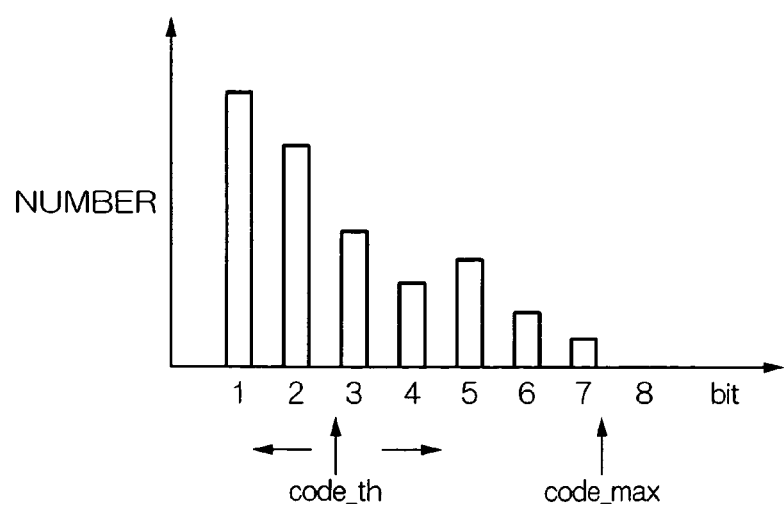
FIG. 19 is a graph showing the distribution of data included in a data string DS1, which is produced through differential operation performed on an original data string DS, with numbers of effective bits therein.

FIG. 19 is a graph showing numbers of data included in the data string DS1 except 0s with respect to numbers of effective bits. This graph clearly shows that after the completion of the differential operation on the data string DS, which is thus converted into the data string DS1, relatively large numbers concentrate on relatively small data, each consisting of a relatively small number of effective bits, wherein there exist relatively large numbers data whose numbers of effective bits are '1' and '2'. Therefore, it is possible to increase the compression efficiency by the compressive coding using the aforementioned format of FIG. 18D.

After the completion of the aforementioned compression procedures, the aforementioned compressive coding is repeatedly performed by changing zero_th and code_th in various values. Thus, it is possible to determine zero_th and code_th which produce the smallest number of bits included in the data string DS1 after the compressive coding.

The aforementioned procedures are performed in the compressive coding based on Scan0. Similarly, other compressive coding is performed based on Scan1 to Scan3 respectively, thus producing the 'optimal' compressed data having the smallest number of bits. The compressed data are stored in the memory together with the number of scanning (i.e., Scan0-Scan3) and parameters therefor. Thereafter, similar compressive coding is performed on the next data (i.e., 16×16 data) to be subjected to compression.

Next, expansion procedures for expanding the compressed data (including the used scanning number and parameters), which were compressed by the aforementioned reversible compression procedures, will be described with reference to FIG. 20.

First, the compressed data except the top data are subjected to decoding using the Huffman tables HT1 and HT2; then, the compressed data except the top data are subjected to decoding in accordance with the SPINET decoding, which is performed using parameters included in the compressed data in accordance with procedures reverse to the aforementioned compression procedures. The top data is decoded to produce data Δp0, which is then restored to original data p0 in accordance with the equation of p0=Δp0+Pre_p0.

Through the aforementioned decoding and the PINET decoding, it is possible to produce a one-dimensional data string consisting of p0, p1, p2, . . . , and p63, which are then rearranged in a two-dimensional manner in accordance with the scanning order designated by the scanning number included in the compressed data. Lastly, blocks of data after expansion are combined together to restore the original picture data DS.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A display data compression method in which a plurality of display data representing dots displayed on a screen of a display are divided into a plurality of two-dimensional blocks, which are subjected to reversible compression, said display data compression method comprising the steps of:
    performing scanning on the display data of each block in accordance with a first scanning method, by which the display data are rearranged and are then subjected to compression using a Huffman table;
    repeatedly performing scanning on the display data of each block in accordance with a second scanning method, by which the display data are rearranged and are then subjected to compression using a Huffman table; and
    selecting the scanning method for realizing a smallest number of effective bits in compressed data, thus selectively outputting the compressed data based on the selected scanning method.

2. A display data compression method according to claim 1, wherein the compression is realized by performing differential operation on adjacent data included in the rearranged display data, thus producing differential data.

3. A display data compression device in which a plurality of display data representing dots displayed on a screen of a display are divided into a plurality of two-dimensional blocks, which are subjected to reversible compression, said display data compression device comprising:
    a first means for performing scanning on the display data of each block in accordance with a prescribed scanning method, which is selected from among a plurality of scanning methods, thus rearranging the display data;
    a second means for performing compression on the rearranged display data using a Huffman table, thus producing compressed data; and
    a third means for selectively outputting the compressed data having a smallest number of effective bits, which are produced in accordance with the selected scanning method.

4. A display data compression device according to claim 3, wherein the compression is realized by performing differential operation on adjacent data included in the rearranged display data, thus producing differential data.

* * * * *